June 6, 1967 J. O. BERZINS 3,323,973
ARTIFICIAL TREE
Filed March 2, 1964

INVENTOR.
JANIS O. BERZINS.
BY Featherstonhaugh & Co.

United States Patent Office 3,323,973
Patented June 6, 1967

3,323,973
ARTIFICIAL TREE
Janis O. Berzins, 22 Farrington Drive, Willowdale, Ontario, Canada
Filed Mar. 2, 1964, Ser. No. 348,608
1 Claim. (Cl. 161—22)

This invention relates to an artificial tree.

Pine, spruce and like evergreen trees are extensively used as interior decoration at the Christmas season. Natural trees, cut for the purpose, are very untidy because the needle foliage thereof tends to fall off the tree as the tree dries out. Recently there has been quite a tendency to use artificial trees to avoid the inconvenience and untidyness of natural trees and various constructions have been used. Artificial trees have the additional advantages of being flame proof and economical since they can be stored and used year after year.

This invention relates to an artificial tree construction wherein the branches are formed by a piece of foliage carrying wire that is looped and secured at its ends to the tree trunk. Trees of this general construction are known. The wire used for the branches has been relatively soft and the free ends of each wire have been secured to the trunk at different heights. The wires are folded against the trunk for packing and the user pulls them outwardly and bends the wires to simulate branches to set the tree up for use. The setting up of such a tree requires considerable skill. In the first place the shaping of the loops must be carefully and skillfully done to get the right effect. The ends of the wire from which each branch is formed is joined to the trunk at different heights, with the result that it is difficult to form a loop having a plane to simulate a bough of a tree.

It is an object of this invention to make an artificial tree of the type where the foliage is carried by a looped wire that can be quickly set up without the application of any special skill and which at the same time will give a better impression of a real evergreen tree. It is also an object of the invention to provide a tree construction that has additional strength to support ornaments and the like.

According to the invention an artificial tree has a trunk and a plurality of branches, each comprising a piece of wire terminating in end portions and carrying artificial foliage between the end portions. The wire is bowed in a permanently shaped loop and secured adjacent the end portions to the trunk, with the end portions at about the same distance from the bottom of the trunk, whereby the loop can be swung in an arc about the trunk from a folded position juxtaposed to the trunk to an operative position where the plane of the loop simulates a bough of a tree and vice versa. The same desirable effect can be obtained by employing various methods of attaching the loops to the trunk. For example the loops may be completed prior to securing the wire to the trunk by securing one end portion to the other by winding one end portion around the other end portion and then securing one end portion to the trunk. Also the end portions may be independently secured to the trunk such that the point on each end portion about which the loop is swung be at substantially the same height from the bottom of the trunk. It will be apparent that in both cases the loop is secured to the trunk adjacent the end portions, the end portions being about the same distance from the bottom of the trunk. The invention will be clearly understood after reference to the following specification read in conjunction with the drawings.

Figure 1:
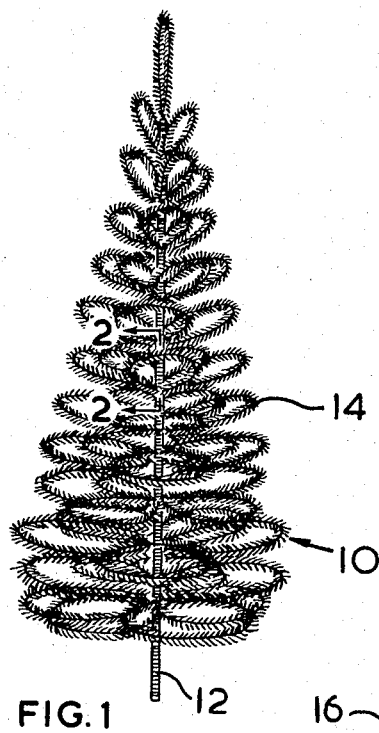
FIGURE 1 is a view of an evergreen tree according to this invention.
Figure 2:
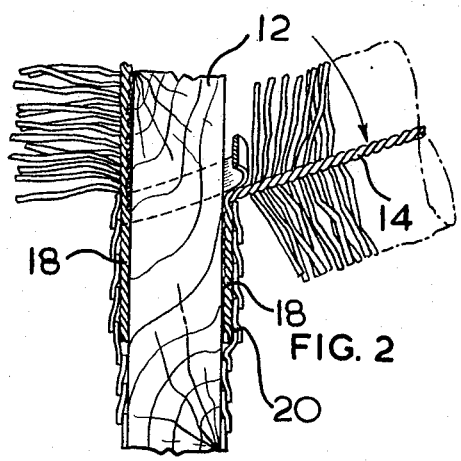
FIGURE 2 is a view along the line 2—2 of FIGURE 1, showing the securement of the branches to the trunk.

Referring to the drawings, the numeral 10 shows an artificial evergreen tree according to this invention. It comprises a trunk 12 made from a wooden or like pole and a plurality of branches 14 secured to the trunk from adjacent its bottom to its top to simulate a tree. The branches are longer at the bottom than at the top and they extend all around the trunk to simulate the cone shape of a real tree.

Figure 3:
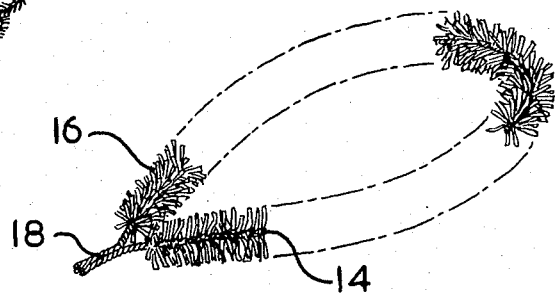
FIGURE 3 is a view of a branch.

The branches 14, as best seen in FIGURE 3, consist essentially of a composite wire formed from two co-extensive pieces of wire twisted together to hold therebetween shreds 16 of a green coloured sheet material that simulates the evergreen tree foliage.

Figure 4:
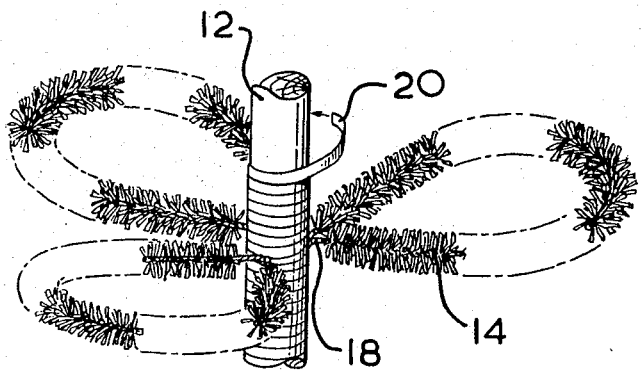
FIGURE 4 shows three branches of equal height on the trunk and their securement to the trunk.

The wire from which the branches 14 are formed has a stiffness such that when it is bowed as illustrated in FIGURES 3 and 4, it forms a permanently shaped loop and the free end portions 18 are secured to the trunk by the binding tape or wire 20 at about the same distance from the bottom of the trunk, as shown in FIGURE 4, so that the plane of the loop when bent to an operative position where it assumes the position of a tree bough accurately simulates a branch of an evergreen tree.

The loops are elliptical but tend to be more rounded towards the bottom of the tree. The angle of the loops to the tree trunk is more acute near the top of the tree than at the bottom when they are in their operative position.

By reason of the fact that both end portions of each wire are at about the same height on the trunk, each branch can be simply folded from its operative position illustrated by swinging it to bend the wire where it joins to the trunk and carry it in an arc to a folded position where it lies juxtaposed to the trunk. This tree can be readily stored in this position.

It will also be apparent that the tree can be readily moved from the folded position to the set up position by reversing the process and that in each case without disturbing the shape of the permanently shaped branches. The branches when moved to the operative position assume a very natural attitude because the ends of the wire connect at the same trunk height. The branches also have considerable strength and are able to support usual decorations and the like.

There are, of course, general features of construction of the tree that are common to the trade and known to those in the art. For example, the branches near the bottom of the trunk are larger and more numerous that those at the top. It is also comon when folding trees of this type to fold the top branches first. The binding tape, wire or cord is coloured to simulate a tree trunk. Tall trees (6, 7, 8 feet) are made of 2 or 3 pieces.

Embodiments of the invention other than the one illustrated will be apparent to those skilled in the art and it is not intended that the foregoing specification should be read in a limiting sense.

What I claim as my invention is:

An artificial tree comprising a trunk having a bottom and a top, a plurality of branches, said branches each comprising a wire terminating in end portions with artificial foliage carried by said wire between said end portions, said wire being bowed in a permanently shaped loop, said loop being secured to said trunk adjacent said end portions, said end portions being the same distance from said bottom of said trunk whereby said permanently shaped loop can be swung in an arc the plane of which includes the longitudinal axis of said trunk about said trunk from a folded position juxtaposed to said trunk to an operative position extending outwardly from said trunk to simulate the bough of a tree said wire having a stiffness to maintain said permanently shaped loop bowed as aforesaid.

References Cited

UNITED STATES PATENTS

| 3,084,465 | 4/1963 | Hellrich | 161—22 |
| 3,154,457 | 11/1964 | Ranoha | 161—22 |

FOREIGN PATENTS

| 1,272,594 | 8/1961 | France. |

JACOB H. STEINBERG, *Primary Examiner.*